United States Patent [19]

Collins

[11] Patent Number: 4,762,451
[45] Date of Patent: Aug. 9, 1988

[54] CAGED NUT WITH ISOLATORS

[75] Inventor: James F. Collins, Farmington, Mich.

[73] Assignee: General Motors Corporation, Detroit, Mich.

[21] Appl. No.: 947,196

[22] Filed: Dec. 29, 1986

[51] Int. Cl.⁴ ............................................. F16B 43/00
[52] U.S. Cl. .................................. 411/177; 411/427; 411/900; 439/546
[58] Field of Search ............... 411/177, 176, 180, 173, 411/172, 908, 907, 432, 427, 900, 901, 902; 339/125 R, 125 L

[56] References Cited

U.S. PATENT DOCUMENTS

| 2,041,995 | 5/1936 | Edwards | 339/125 R |
| 2,592,130 | 4/1952 | Erb et al. | 411/908 X |
| 2,781,498 | 2/1957 | Maly | 339/125 R |
| 2,802,503 | 8/1957 | Zupa | 411/176 |
| 3,568,311 | 3/1971 | Lawton | 411/908 X |
| 3,624,867 | 12/1971 | Reynolds | 411/427 X |
| 4,295,766 | 10/1981 | Shaw | 411/177 X |
| 4,348,140 | 9/1982 | Bergholz et al. | 403/408.1 X |

FOREIGN PATENT DOCUMENTS

| 351202 | 6/1931 | United Kingdom | 411/427 |
| 665544 | 1/1952 | United Kingdom | 411/908 |
| 682498 | 11/1952 | United Kingdom | 411/432 |
| 1082207 | 9/1967 | United Kingdom | 411/176 |

Primary Examiner—Lloyd A. Gall
Attorney, Agent, or Firm—Arthur N. Krein

[57] ABSTRACT

Electrically non-conductive isolators are secured by a press fit into the apertures in the lugs of a metal, floating anchor type nut so as to electrically isolate the nut from an associate metal cage so that during the electro-deposition of paint onto the cage, the paint will not adhere to the nut or the internal threads of the nut.

1 Claim, 1 Drawing Sheet

CAGED NUT WITH ISOLATORS

FIELD OF THE INVENTION

This invention relates to caged nuts and, in particular, to a caged nut with electrical isolators.

DESCRIPTION OF THE PRIOR ART

A caged nut, also referred as a floating nut or anchor nut, normally includes a nut with a main body portion having internal threads therein and with apertured lug or ears extending radially outward from opposite sides thereof, so that the nut can be loosely secured to a cage having upturned, return bent legs used to capture the nut. The cage, as well known, can be formed as a separate element which can be suitably secured to a support plate, as on the blind side thereof, or the cage can be formed as an integral part of the support plate. The floating feature of such a caged nut resides in the capability of the nut to move or slide within its associate cage in order that the nut can line up with a machine screw used to secure a second member to the support plate.

Such caged nuts, as used in automotive vehicles, are normally trapped inside a sheet metal structure such as the car body. In such installations, the caged nuts are installed in the sheet metal structure before it is painted.

Applicant has discovered that when paint is applied to such a sheet metal structure through electro-deposition, a process similar to electro-plating, that paint will deposit on the internal threads of the nut and also on the remainder of the nut and its associated cage to an extent such that the nut is, in effect, bonded to its cage by paint and, accordingly, an assembler will have to jar the nut loose so that it can move to permit the nut to line up with a machine screw used to secure a second member. The above occurs because the metal nut is in electrical contact with its cage at least in one location.

SUMMARY OF THE INVENTION

The present invention relates to an improved caged nut wherein electrical non-conductive flanged grommets are positioned in the apertures of the lugs of such a nut so as to electrically isolate the nut from its associate cage, whereby during painting of a support panel to which the nut is attached by the electro-deposition of paint, the paint cannot be electrically deposited on the internal threads of the nut or on the lugs thereof.

It is, therefore, a primary object of this invention to provide electrical, non-conductive plastic flanged grommets in the apertured legs of a cage nut whereby to support the cage nut out of electrical contact with its associate cage, such as a support panel structured as a cage, during the electro-deposition of paint on both sides of the support panel.

For a better understanding of the invention as well as other objects and further features thereof, reference is had to the following detailed description of the invention to be read in connection with the accompanying drawings.

DESCRIPTION OF THE PREFERRED EMBODIMENT

Figure 1:
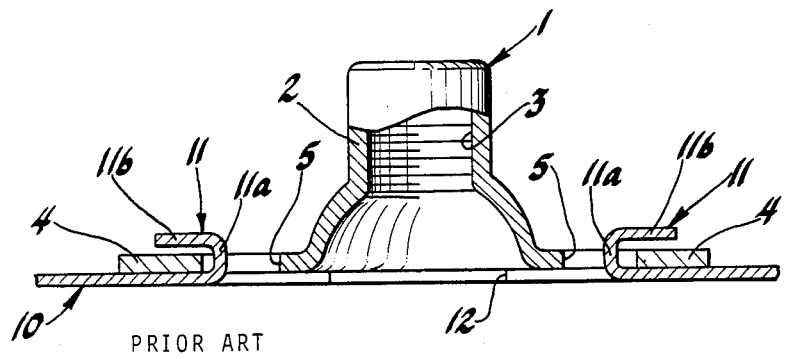
FIG. 1 is a cross-sectional view of a conventional type cage nut wherein the cage for the nut is formed as an integral part of a support plate.

Referring first to FIG. 1, there is shown a conventional anchor type nut, generally designated 1, which in the construction is illustrated as a cage nut.

Figure 2:
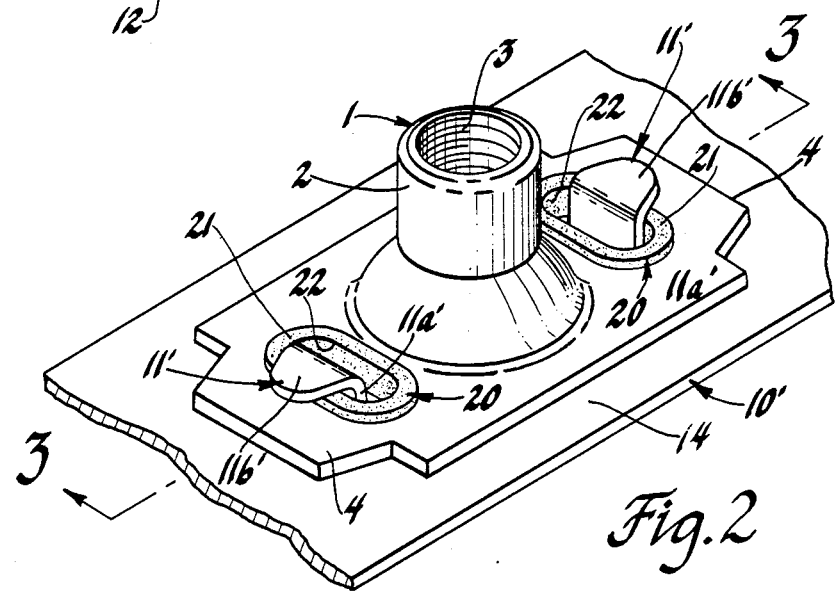
FIG. 2 is a perspective view of the cage nut of FIG. 1 but having electrical non-conductive, isolator grommets press fitted in the apertures in the lugs of the nut, per se, whereby the nut is positioned out of electrical contact with its associate cage in the form of a sheet metal support panel.

In the construction shown, the nut 1, formed of sheet metal, includes an extruded tubular nut body 2 having internal threads 3 formed in at least one axial portion thereof, that is, in the outboard axial free end thereof. The nut 1 also includes radially outward extending diametrically opposed lugs 4 formed integral with the tubular nut body 2, with each lug 4, in the construction shown, having an aperture 5 extending therethrough. The apertures 5 can be formed as circular apertures or, as shown and as best seen in FIG. 2, as an elongated transverse aperture.

Figure 4:
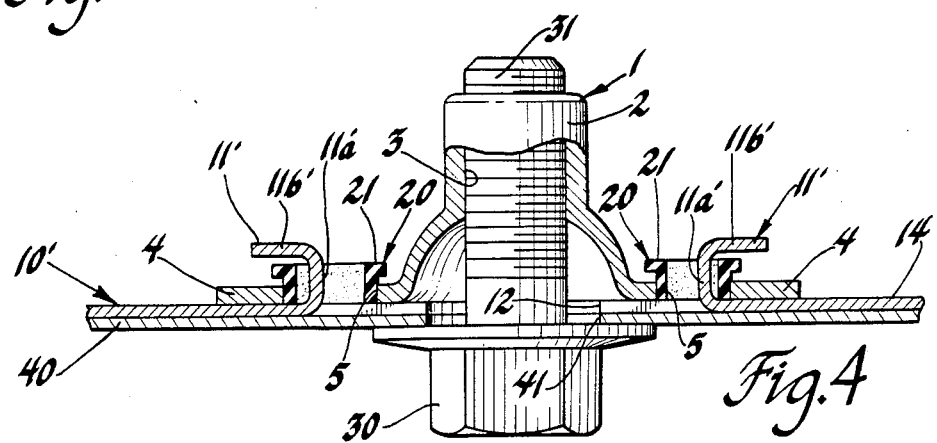

When used as a cage nut, the nut can be secured as by return bent legs 11 to a separate cage which, in turn, can be suitably fixed to a sheet metal support panel 10 as by welding or as shown, the support panel 10 per se can be properly configured so as to form the cage for the nut 1. Thus, as shown in FIG. 1, the support panel 10 is provided with a central opening 12 of a predetermined internal diameter to loosely receive a flange head machine screw 30 as shown in FIG. 4. On diametrically opposite sides of the opening 12, the support panel is suitably pierced, as known in the art, whereby each of the return bent legs 11 can be formed from the material of the support panel 10.

As shown in FIG. 1, each leg 11 includes an upright leg portion 11a of a suitable height to extend loosely up through an associate aperture 5 in a lug 4, and a return bent portion 11b that extends radially away from the nut body 2 of nut 1.

However, it should be apparent that in regard to the prior art construction shown in FIG. 1, that whatever the position is of the support panel 10, the nut can move relative to this support panel 10 such that the nut 1 will be in electrical contact with a portion of the support panel. Accordingly, assuming for example, that the nut 1 rests on the support panel in the manner shown in FIG. 1 while the support panel 10 is being painted by an electro-deposition process, paint can coat onto the internal threads 3 of the nut 1 which then makes it very difficult to properly torque a machine screw into the internal threads 3 of the nut 1 and, in addition, a coating of paint can adhere on adjacent surfaces of the lugs 4 and of the support panel 10 so that the nut 1 will then adhere to the support panel 10 in a manner such that the nut 1 is no longer floating relative to the support panel 10 unless deliberately jarred loose again by an assembler.

Figure 3:
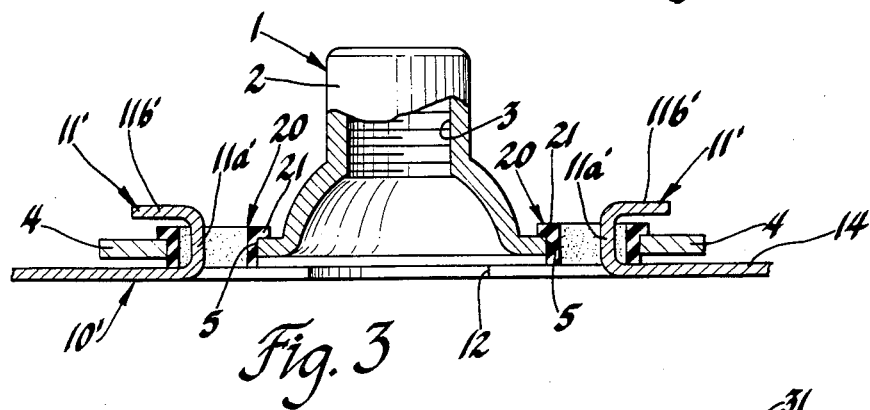
FIG. 3 is a cross-sectional view of the assembly of FIG. 2 taken along line 3—3 of FIG. 2; and, FIG. 4 is a cross-sectional view of the cage nut assembly of FIG. 3 shown as having a second element fixed thereto by a flange headed machine screw.

A cage nut, in accordance with the invention, is shown in FIGS. 2, 3 and 4, wherein similar parts that were shown in FIG. 1 are designated by similar numerals but with the addition of a prime (') where appropriate.

Thus, in the embodiment shown in FIGS. 2-4, the nut 1 is the same as that shown in FIG. 1 and is formed of sheet metal so as to include an extruded tubular nut body 2 having internal threads 3, with opposed radially outward extending lugs 4, each of which is provided with an elongated, transverse aperture 5 therethrough.

Now in accordance with a feature of the subject invention, an electrical isolator, generally designated 20, in the form of a grommet having an enlarged flange 21 with a depending hollow shank 22, both conforming in general to the configuration of the associate aperture 5 has its shank suitably secured as by a press fit into the aperture 5 until the flange 21 thereof abuts against the upper surface of the associate lug 4 while the lower end face of the shank 22, as shown in FIG. 3, extends through the aperture 5 so as to abut against the support panel 10. With this arrangement and as best seen in FIG. 3, the nut 1 can thus be supported in spaced apart relationship relative to the blind side surface 14 of the support panel 10' and to the legs 11' thereof by the isolators 20.

The electrical isolators or grommets 20 are made of a suitable plastic material that is both an electrical nonconductive, that is, an electrical insulator and is preferably capable of withstanding the heat normally encountered in a conventional vehicle paint drying operation which is normally in the range of 300° to 350° F. By way of examples, the electrical isolators 20 can be made of VYDYNE, a heat stabilized nylon 6-6 manufactured by Monsanto Co. of St. Louis, Mo. or of TEFLON, a synthetic resinous fluorine-containing polymers manufactured by DuPont De Nemours & Co. of Wilmington, Del.

When using the isolators 20 inserted into the apertures 5 of the lugs 4 of the nut 1, the support panel will be provided with a central aperture or opening 12 to loosely receive a machine screw 30, as shown in FIG. 4 and it is pierced to provide for the return bent legs 11'. However, because of the use of the isolators 20, each of the upright leg portions 11a' are of a greater extent as shown in FIGS. 3 and 4, than the leg portions 11a in the prior art embodiment shown in FIG. 1 so that the return bent portions 11b' can be raised to a position so as to accommodate the axial height of the isolators 20.

The isolators 20 during painting of the support panel 10 by electro-deposition and best seen in FIG. 3 provides two important features:

(1) By electrically isolating the nut 1 from the support panel 10', electro-deposition paint will not coat the nut 1 or the internal threads 3 thereof; and (2) By raising the nut 1 off the support panel and out of contact with the legs 11' thereof, the nut 1 will not become bonded to the support panel 10' when the latter is painted by an electro-deposition process.

Now as shown in FIG. 4, after the support panel 10 has been painted by electro-deposition and then dried, a second member 40 having an aperture 41 therethrough can be secured against the support panel 10 by a flanged head machine screw 30 having an externally threaded shank 31 that is threadingly received by the internal threads 3 of nut 1. Without any paint on the internal threads 3, the machine screw can be torqued down to a predetermined amount, as desired. The press fit of the hollow shanks 22 of the isolators 20 is such that when the nut 1 is clamped down onto the blind surface side 14 of the support panel 10, the position shown in FIG. 4, the isolators 20, by their abutment at one end against the blind surface side of the support panel 10, will be forced axially upward relative to the lugs 4 such that none of the material of these isolators 20 will be trapped between the lugs 4 of the nut 1 and the blind side surface 14 of the support plate 10'.

While the invention has been described with reference to the structure disclosed herein, it is not confined to the specific details set forth, since it is apparent that many modifications and changes can be made by those skilled in the art. For example, the isolators 20 can be modified as necessary for use with any type floating nut and which may or may not be mounted in a separate cage, with the latter then being suitably secured to a support panel. This application is therefore intended to cover such modifications or changes as may come within the purposes of the improvements or scope of the following claims.

The embodiments of the invention in which an exclusive property or privilege is claimed are defined as follows:

1. In a caged nut assembly of the type including an anchor nut having a tubular nut body portion with internal threads therein and having radial outward extending integral lugs with each such lug having an aperture therethrough and an apertured cage means for the anchor nut with the apertured cage means having upstanding and return bent legs which extend through the apertures to loosely retain the anchor nut in unit assembly with the apertured cage means, the improvement wherein an isolator of an electrical insulating material and having an annular enlarged flange and a hollow shank depending therefrom and of a configuration corresponding to the apertures in said lugs has said hollow shank thereof secured by a press fit in each of said apertures in said lugs with said flange between said return bent legs and said nut lugs so as to extend outward from said lugs whereby said anchor nut can be supported out of electrical contact with said apertured cage means so that during painting of said apertured cage means by an electro-deposition process, paint will not adhere to said internal threads of said anchor nut and to prevent bonding of said anchor nut to said apertured cage means by paint, the axial extent of said hollow shank being greater than the thickness of said nut lugs, such that after the painting process, as when said caged nut is secured as by a bolt to a second workpiece, said isolators can be axially moved with respect to said nut lugs whereby said anchor nut can then abut against said apertured cage means.

* * * * *